United States Patent
Elangovan et al.

(10) Patent No.: US 11,037,387 B1
(45) Date of Patent: Jun. 15, 2021

(54) RELAY ATTACK MITIGATION AND PREVENTION

(71) Applicant: Ford Global Technologies, LLC, Dearborn, MI (US)

(72) Inventors: Vivekanandh Elangovan, Canton, MI (US); John Robert Van Wiemeersch, Novi, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/752,599

(22) Filed: Jan. 24, 2020

(51) Int. Cl.
*G07C 9/00* (2020.01)
*H04W 4/80* (2018.01)
*H04W 84/12* (2009.01)

(52) U.S. Cl.
CPC ............ *G07C 9/00309* (2013.01); *G07C 2009/00555* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2016/0027226 A1 | 1/2016 | Gigl et al. | |
| 2017/0272906 A1* | 9/2017 | Kerai | H04W 4/80 |
| 2018/0162321 A1* | 6/2018 | Spiess | G07C 9/29 |
| 2018/0374290 A1 | 12/2018 | Björkengren | |
| 2020/0029213 A1* | 1/2020 | Nolscher | B60R 25/24 |

FOREIGN PATENT DOCUMENTS

| | | |
|---|---|---|
| DE | 10310869 A1 | 9/2004 |
| DE | 102017203914 A1 | 9/2017 |

* cited by examiner

*Primary Examiner* — Thomas S McCormack
(74) *Attorney, Agent, or Firm* — Frank Lollo; Eversheds Sutherland (US) LLP

(57) ABSTRACT

This disclosure describes systems, methods, and devices related to enhanced time of flight (ToF) calculation using phase measurements. A device may identify a radiofrequency (RF) signal received from a vehicle key, wherein the RF signal comprises a command associated with a vehicle. The device may select a first subset of a frequency bandwidth. The device may perform a first time-of-flight calculation associated with the RF signal using a phase shift measurement on a first subset of frequency bandwidth. The device may determine a distance between the vehicle key and the vehicle based on the first time-of-flight calculation. The device may compare the distance to a predetermined threshold. The device may determine a status of the RF signal based on the comparison.

19 Claims, 4 Drawing Sheets

RELAY ATTACK MITIGATION AND PREVENTION

TECHNICAL FIELD

This disclosure generally relates to systems, methods, and devices for relay attacks and, more particularly, to relay attack mitigation and prevention.

BACKGROUND

Remote keyless entry systems comprise a portable control unit (e.g., a key fob) that controls certain functions of a device (e.g., a vehicle). The key fob is typically carried by a user of the vehicle. The key fob and the vehicle wirelessly communicate with one another. In certain situations, a relay attack may be initiated by an attacker. The attacker may attempt to amplify or relay RF communication signals between the key fob and the vehicle. Since present passive entry/passive start (PEPS) key systems rely on RF signal strength to determine the key fob's distance to the vehicle, this amplification or relay action may make it appear to the vehicle that the key fob is nearby when in fact it may not be.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
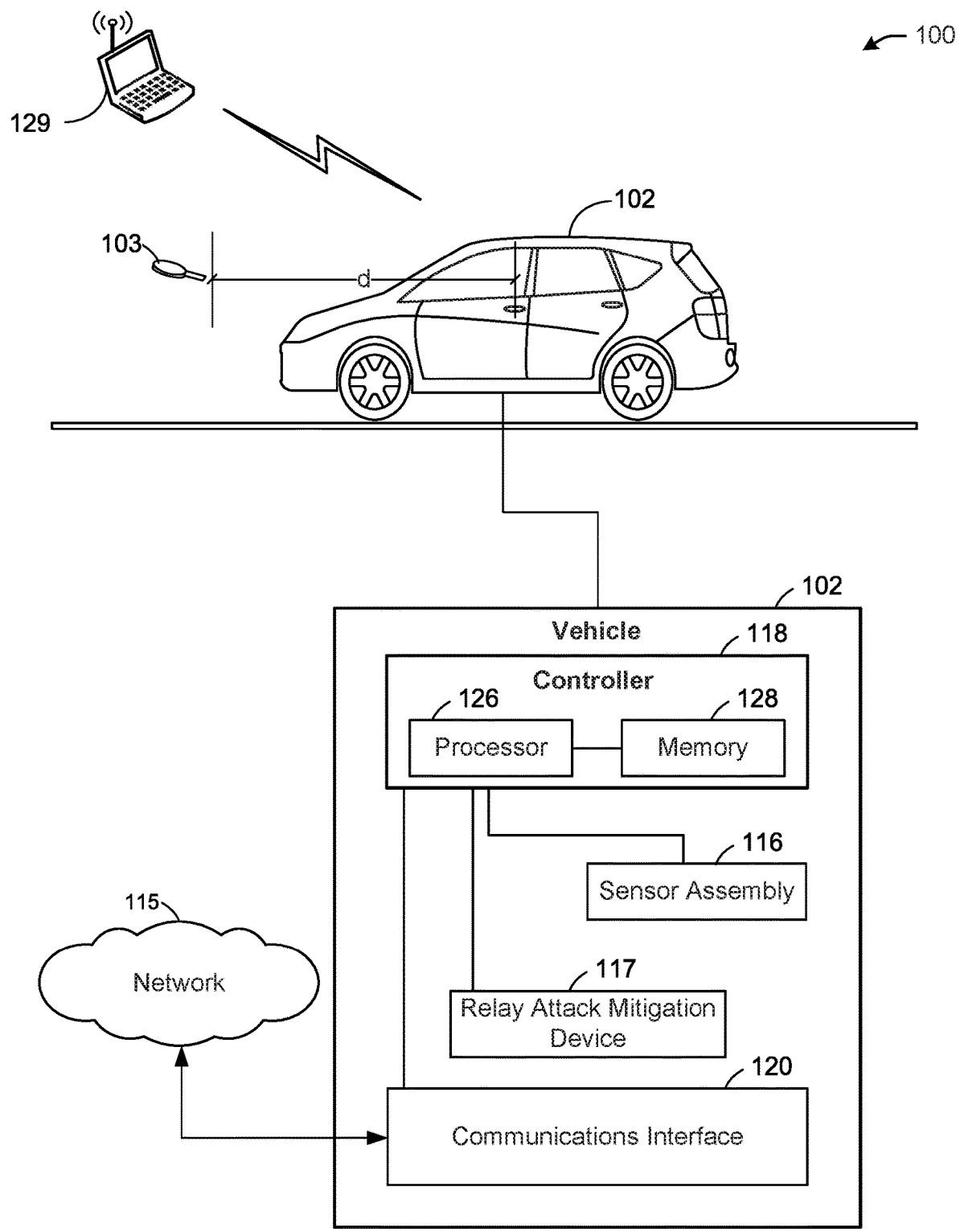
FIG. 1 depicts a diagram illustrating an example environment for techniques and structures, in accordance with one or more example embodiments of the present disclosure.

Example embodiments described herein provide certain systems, methods, and devices, for relay attack mitigation and prevention.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Overview

Relay attacks are likely to extend to Phone-as-a-Key (PaaK) systems since Phone-as-a-Key systems also rely on signal strength to determine the Phone's distance from the vehicle. Since most PaaK systems use a bonded or paired communication strategy, this allows up to 37 channels of Bluetooth® low energy (BLE) communication and even a greater number of communication channels if Wi-Fi is used for the Phone-to-Vehicle communication. Therefore, the task becomes more difficult for an attacker since all the available channels would need to be amplified and/or relayed together because BLE technology uses a random channel hopping approach that cannot be predicted by the attacker. This will require more sophisticated and expensive equipment to be used by attackers, limiting the method to more experienced or professional attackers, but eventually, multi-channel relay attack equipment will also become affordable to the masses.

Present production PEPS key systems and Phone-as-a-Key (PaaK) key systems could experience relay attacks because they utilize signal strength to determine the key's distance to the vehicle. In order to prevent these attacks, key fob based PEPS and Phone-as-a-Key based PEPS systems need to be able to determine a distance between the key and vehicle without just relying on signal strength.

There are known solutions for mitigating the occurrence rate of relay attack but they each have their disadvantages. In short, the lower cost solutions do not provide adequate mitigation range from the vehicle, take time, or consume too much RF bandwidth or battery power from the key fob or Phone and/or the vehicle. Conversely, solutions that provide high protection or prevention right up to within a foot or so of the vehicle are prohibitively costly and require sophisticated incremental hardware in both the fob or phone and/or the vehicle.

The known state of the art solution to relay attacks is the use of Ultra-Wideband (UWB) frequencies in the 6-8 GHz band that allow a large bandwidth of frequencies to be allocated to perform multiple time of flight (ToF) calculations to achieve ToF accuracy down to 5-10 cm or so. However, UWB requires new custom hardware in the fob, phone, and/or the vehicle, which may add increased equipment costs.

The systems, devices, and methods disclosed herein are configured to provide relay attack mitigation and prevention mechanisms for BLE based PEPS key fob systems. In a relay attack scenario, an attacker may attempt to amplify the Low Frequency (LF) and/or BLE signal between the key fob and the vehicle to try to trick the vehicle into determining that the key fob is within a certain zone allocated for passive entry or start of the vehicle. A relay attack mitigation and prevention system may use an enhanced ToF calculation that uses phase measurements of signals to determine a distance between the key fob and the vehicle. In a phase measurement, multiple channels are used to measure the phase difference between these multiple channels. For example, 1 MHz channel bandwidth is selected on an 80 MHz channel system in order to perform the phase measurement. In a phase measurement, the phase difference between a transmitted signal and a received is calculated in order to determine a ToF calculation. That is, the phase shift is calculated between the signals that arrives at the receiver with respect to the transmitted signal in order to determine how far the signal traveled. Further, when the full 80 MHz bandwidth of BLE is used, a BLE ToF distance accuracy of about 2-6 meters may be achieved by performing ToF calculations 80 times on 1 MHz channels. However, this leaves no BLE bandwidth for other communications when a ToF calculation is in progress. An enhanced ToF calculation using phase measurements may facilitate using one or more subsets of the 80 MHz BLE bandwidth. Thus, the ToF calculation using phase measurements of the subset of an 80 MHz BLE bandwidth results in a determination of whether a relay attack is occurring or not based on a comparison to a predetermined distance threshold between the key fob and the vehicle (e.g., a certain zone allocated for passive entry or passive start of the vehicle). Subsequently, remedial actions may be taken such as preventing access to the vehicle after determining that such a relay attack has occurred. For example, instead of using a 1 MHz channel bandwidth, 4 MHz channel bandwidth may be used by using phase measurements on a subset of the 80 MHz BLE bandwidth. As a result of the phase measurements using a subset of the 80 MHz BLE bandwidth, an initial location of the key fob is determined which is compared to a threshold distance from the vehicle. Additional phase measurements may be performed on a larger subset of the 80 MHz BLE bandwidth to increase the accuracy of the location of the key fob.

A relay attack mitigation and prevention system may facilitate the use of radio frequency (RF) fingerprinting. RF fingerprinting is a technique used to search for unique characteristics of RF signals that are part of the non-linear components of the key fob or phone and the vehicle Receiver. Each of the components within an RF chain has its own unique properties that result from the manufacturing process even if the components are from the same manufacturer and even from the same batch.

A relay attack mitigation and prevention system may facilitate a mechanism for using blockchain for the RF fingerprint analysis to ensure an attacker cannot alter the signal phase without detection. The mechanism may create a decentralized process of performing fingerprint analysis. The relay attack mitigation and prevention system may be configured to perform a method for secure ranging, where a blockchain-based network may be used to identify fingerprint characteristics. The fingerprint analysis may be done using a collaborative method from a combination of authentication of the fingerprint and/or a multitude of entities performing the fingerprint analysis and providing a cryptographic result indicating whether this is a valid fingerprint of the key fob and/or the vehicle. The blockchain may also provide information regarding blacklisted or whitelisted fingerprints based on historic data of rejected or approved fingerprints.

Typically signals take the same time to be transmitted over a certain distance under similar environment conditions. When the vehicle calculates the distance, the vehicle determines that a portable device such as key fob, phone, tablet, notebook, etc., is at that certain distance from the vehicle. For ease of description, a key fob or a phone will be used for illustration purposes. In case there is a mismatch between the ToF calculations and the received signal strength indicator (RSSI) measurement, a relay attack may be determined. The vehicle would not allow access to the vehicle. For example, the zone definition may say that the key fob should be within 2 meters and when the ToF calculations are performed using the relay attack mitigation and prevention system, the portable device may be determined to be within 10 meters, meaning that the accuracy may be sacrificed and additional ToF measurements may be taken to meet the zone definition before allowing access to the car.

In an attack, the attacker's computer intercepts the LF/RF signal from the vehicle and amplifies that LF/RF signal to the key fob. When the key fob receives the LF/RF signal, it measures the LF/RF signal and responds back to the vehicle. The vehicle may receive the signal strength measured by the key fob and makes a determination of whether to provide access to the vehicle or the signal strength of the phone as measured by the vehicle is used to make a determination of whether to provide access to the vehicle. When the attacker's computer amplifies the signal received by the key fob or phone, the key does not know if anyone is amplifying the signal. The key fob typically measures the signal strength and provides to the vehicle, indicating the signal strength measured by the key fob. In case of an attack, the signal strength would be high and even though the attacker may be far, the vehicle determines that the distance is within the threshold to allow access to the vehicle. However, performing an enhanced ToF calculation using phase measurements, instead of measuring the strength of the signal, results in measuring the RF performance or the RF characteristics while propagating from the vehicle to the key fob (or phone) and back. The propagation timing of the RF signal to travel from the vehicle to the key and back to the vehicle cannot be spoofed by amplifying the signal (e.g., during an attack). In order to perform the enhanced ToF using phase measurements, a subset of an 80 MHz BLE bandwidth such that ToF calculation using phase measurements of the subset of an 80 MHz BLE bandwidth results in a determination of whether a relay attack is occurring or not even though the RF signal may be amplified.

ILLUSTRATIVE EMBODIMENTS

Turning now to the drawings, FIG. 1 depicts an illustrative architecture 100 in which techniques and structures of the present disclosure may be implemented.

The illustrative architecture 100 may include a vehicle 102. The vehicle 102 may support various operations in accordance with the disclosure. The vehicle 102 may be any of various types of vehicles such as a gasoline-powered vehicle, an electric vehicle, a hybrid electric vehicle, or an autonomous vehicle. Further, this principle may apply to any compartment or unit for which a portable RF device is used to gain passive access (i.e., a garage, storage unit, hotel room, locker, etc.).

The vehicle 102 may be located in proximity to a hacker device 129. In general, the hacker device 129 could include any hardware capable of interacting with the vehicle 102 either encountered during driving the vehicle 102 or when the vehicle is stationary. Further, the hacker device 129 could include any hardware capable of interacting with the key fob or phone either encountered when in motion or when stationary. The attacker device 129 may remotely access one or more components of the vehicle 102 in order to meddle with one or more components of the vehicle 102. The attacker device 129 may be capable of injecting controller area network (CAN) messages into a CAN bus which may then manipulate these CAN messages to activate some undesirable features on the vehicle 102.

In the exemplary embodiment shown in FIG. 1, the vehicle 102 may be connected to a network 115 that allows the vehicle 102 to communicate with external services and/or devices (e.g., computers, user devices, or other vehicles). The network 115 may include any network, or a combination of networks, such as a local area network (LAN), a wide area network (WAN), a telephone network, a cellular network, a cable network, a wireless network, and/or private/public networks such as the Internet. For example, the network 115 may support communication technologies such as Bluetooth®, cellular, near-field communication (NFC), Wi-Fi, Wi-Fi direct, Ultra-Wide Band (UWB), machine-to-machine communication, and/or man-to-machine communication.

In general, the vehicle 102 may comprise any vehicle that may comprise a controller 118, a sensor assembly 116, a relay attack mitigation device 117, and a communications interface 120.

The vehicle 102 may include a cabin having a display in electronic communication with the controller 118. The display may be a touchscreen that displays information to the passengers of the vehicle and/or functions as an input, such as whether or not the rider is authenticated. A person having ordinary skill in the art will appreciate that different display and input devices are available and that the present disclosure is not limited to any particular display. An audio system may be disposed within the cabin and may include one or more speakers for providing information and entertainment to the driver and/or passengers. The audio system may also include a microphone for receiving voice inputs.

In some embodiments, the controller 118 may comprise a processor 126 and memory 128. The memory 128 includes machine-accessible instructions (e.g., computer-readable and/or computer-executable instructions) that can be accessed and executed by the processor 126. The processor 126 can be embodied in, or can include, for example, a tensor processing unit (TPU); multiple TPUs; a graphics processing unit (GPU); multiple GPUs; a central processing unit (CPU); multiple CPUs; an application-specific integrated circuit (ASIC); a microcontroller; a programmable logic controller (PLC); a field-programmable gate array (FPGA); a combination thereof; or the like. In one or more embodiments, the processor 126 can be arranged in a single computing device (e.g., an electronic control unit (ECU), in-car infotainment (ICI) system, or the like). In other configurations, the processor 126 can be distributed across two or more computing devices (e.g., multiple ECUs; a combination of an ICI system and one or many ECUs; or the like).

In some embodiments, the sensor assembly 116 may comprise one or more sensors capable of capturing data received from objects within the range of the one or more sensors. In some embodiments, the sensor assembly 116 could comprise any of a camera, a time-of-flight (ToF) camera, light detection and ranging (LIDAR), or other similar systems which may be utilized to recognize and capture data associated with objects and/or a driver of the vehicle 102. The sensor assembly 116 may include a steering sensor that may be disposed proximate the steering shaft to measure a steering angle. The vehicle 102 also includes a speed sensor that may be disposed at the wheels or in the transmission of the vehicle 102. The speed sensor is configured to output a signal to the controller 118 indicating the speed of the vehicle. Also, the sensor assembly 116 may comprise a yaw sensor that may be in communication with the controller 118 and is configured to output a signal indicating the yaw of the vehicle 102.

The sensor assembly 116 may be configured for sensing areas external and/or internal to the vehicle. The controller 118 may communicate via a serial bus (e.g., controller area network (CAN)) or via dedicated electrical conduits. The controller generally includes any number of microprocessors (including processor 126), ASICs, ICs, memory (e.g., FLASH, ROM, RAM, EPROM and/or EEPROM) and software code to co-act with one another to perform a series of operations. The controller also includes predetermined data, or "lookup tables" that are based on calculations and test data, and are stored within the memory. The controller may communicate with other vehicle systems and controllers over one or more wired or wireless vehicle connections using common bus protocols (e.g., CAN and local interconnect network (LIN)). Used herein, a reference to "a controller" refers to one or more controllers and/or computer processors. The controller 118 may receive signals from the vision system and may include memory (e.g., memory 128) containing machine-readable instructions for processing the data from the vision system. The controller 118 may be programmed to output instructions to at least the display, the audio system, the steering system, the braking system, and/or the power plant to autonomously operate the vehicle 102.

The controller 118 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle controller 118 may include more than one computer such as, for example, a first computer that controls engine operations and a second computer that operates an infotainment system.

In one or more embodiments, the relay attack mitigation device 117 may be located separately from other components of the vehicle 102. The relay attack mitigation device 117 may comprise one or more in-vehicle networks that may provide data associated with one or more components of the vehicle.

The various components of vehicle 102 are communicatively coupled to each other via one or more buses. The one or more buses may be implemented using various wired and/or wireless technologies. For example, the one or more buses can include a vehicle bus that uses a controller area network (CAN) bus protocol, a Media Oriented Systems Transport (MOST) bus protocol, and/or a CAN flexible data (CAN-FD) bus protocol. Some or all portions of the one or more buses may also be implemented using wireless technologies such as Bluetooth®, Zigbee®, or near-field-communications (NFC).

Figure 2:
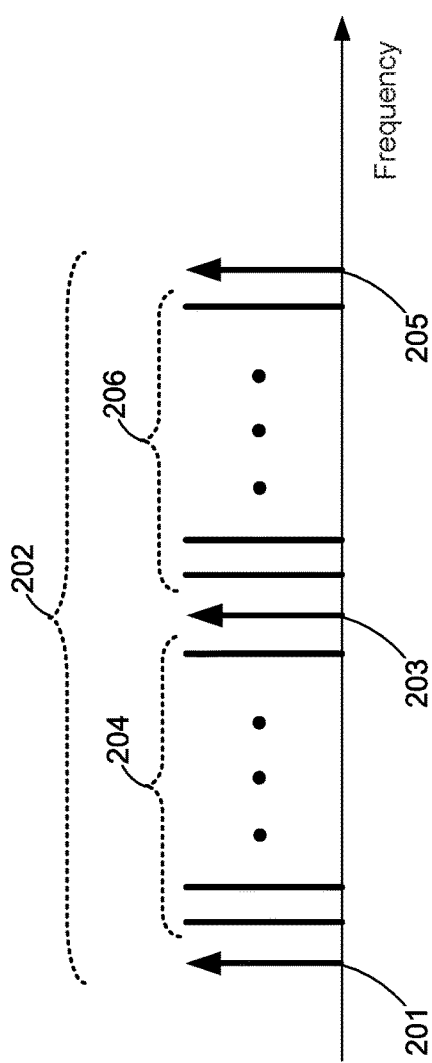
FIG. 2 depicts an illustrative schematic diagram of relay attack mitigation and prevention, in accordance with one or more example embodiments of the present disclosure.

FIG. 2 depicts an illustrative schematic diagram for relay attack mitigation and prevention, in accordance with one or more example embodiments of the present disclosure.

Referring to FIG. 2, there is shown BLE frequency channels 202. BLE frequency channels 202 may be made up of 3 advertising channels (e.g., advertising channels 201, 203, and 205) and 37 data channels (e.g., data channels 204 and 206). The BLE frequency channels 202 may span from 2400 MHz to 2480 MHz, resulting in 80 MHz of usable channels.

Generally, some solutions that are used to minimize relay attacks may have shortcomings. For example, BLE is already implemented on many phones and may be supported in vehicles for other purposes. However, the accuracy of BLE is lower than UWB. Generally, BLE ToF is only capable of about 2 meters accuracy of distance estimation using the full BLE band (80 MHz). However, this can degrade to 4-6 meters in the presence of levels of BLE noise (e.g., BLE activity from other BLE devices and vehicles in the area) that can be common at crowed events and parking areas. A PEPS key that uses BLE ToF would measure the round trip time (RTT) it takes for the vehicle to transmit a challenge to the key fob or phone and then receive back a response from the key fob or phone (Vehicle-to-Key fob and Key fob-to-Vehicle). It would then take this total time and, based on the known fixed propagation time of RF at these frequencies, calculate the distance based on the time. A shortcoming in the use of current BLE ToF is that the entire 80 MHz band of BLE must be used in order to get the best ToF distance estimation of 2-6 meters. This leaves little or no BLE bandwidth for other BLE based features when the vehicle receiver is engaged in a BLE ToF measurement. However, the ToF estimation using RTT may be based on a single channel or the entire channel.

In another example, phase detection and measurement provides high accuracy for distance measurement, but it may be susceptible to relay attacks. The phase measurement can be spoofed because the signal is based on the phase cycle. As the signal travels, and when received, it can be anywhere between 0 and 360 degrees of phase. As such, it can be rolled over which means the distance between the key fob and the vehicle is maxed out by the phase measurement and the measurement starts over from 0 meters. This can manifest itself such that a fob or phone at a far distance of 150 meters approaching 360 degrees of phase (i.e., about to roll-over to zero phase) will look the same as a fob or phone at the vehicle skin that is at zero phase even though the key is truly at a far distance (i.e., 150 meters plus a few centimeters). Basically, due to phase roll-over it is not known if the device under phase measurement is actually where it started (at 0 degrees of phase) or at a distance corresponding to a far distance at 360 degrees of phase.

RF Fingerprinting is a technique used to search for unique characteristics of RF signals that are part of the non-linear components of the key fob or phone and the vehicle Receiver. Each of the components within an RF chain has its own unique properties that result from the manufacturing process even if the components are from the same manufacturer and even from the same batch. Theoretically, during the design process some measures are taken to compensate these nonlinear tolerances but, in fact, there will always be some errors during the establishment of the compensation model. Therefore, the nonlinear components of the signal cannot be completely eliminated. These unique properties create a "fingerprint" of the specific chain of electronic hardware devices used in the RF communication.

Although RF fingerprinting works well on the electronics used for traditional transmit frequencies by UHF fobs (e.g., 315 MHz, 433 MHz, 868 MHz, and 902 MHz) and BLE fob or phones (e.g., 2400 MHz), it does not work well on the low frequency (LF) receiver that is used in today's PEPs fobs to capture the vehicle's low frequency 125 kHz LF challenges to the fob. Therefore, the RF fingerprinting is used mainly on the RF response from the fob and is not of value in a 1-way attack where only the LF is being relayed.

A relay attack mitigation and prevention system may facilitate a framework consisting of an enhanced phase measurement along with RTT ToF and with RF fingerprinting to avoid the shortcomings listed above and to avoid relay attacks.

A relay attack mitigation and prevention system may facilitate relay attack mitigation for BLE based PEPS key fob by maintaining the fob's LF receiver only for use in zone detection by the vehicle. A relay attack mitigation and prevention system may replace the fob's UHF RF transceiver with a BLE transceiver.

A relay attack mitigation and prevention system may adopt the use of BLE multi-phase detection in the fob to gauge the phase on the incoming BLE signal from the vehicle and adopt the use of phase detection at the vehicle on the incoming BLE fob signal. This will allow a high precision method of distance estimation that has good immunity to BLE noise in high BLE activity situations. The high precision can be obtained using the full 80 MHz BLE bandwidth.

To overcome the roll-over problem with phase detection, a relay attack mitigation and prevention system may perform an RTT analysis of the BLE signal to determine Time-of-Flight.

A relay attack mitigation and prevention system may facilitate that during the BLE multi-phase detection, there is no need to use the full 80 MHz BLE allocation available from BLE. Instead, a relay attack mitigation and prevention system may adjust the phase measurement bandwidth utilization to correspond to the approximate RTT or distance indicated by the received RF signal. In this method, only a small portion of the BLE bandwidth is used for phase only when the accuracy is needed based on the ToF Detection indication of distance. In doing so, BLE bandwidth may be used for other BLE communications, reducing the ToF calculation time, and saving bandwidth.

Because the above combination of adjustable phase detection and RTT calculation offers a good level of mitigation, RF Fingerprinting can be performed on the BLE transmission back from the fob rather than on both the fob's RF transition and the vehicle's RF transmission. It should be understood that although the relay attack mitigation and prevention system is shown to apply to BLE PEPS key fobs, the relay attack mitigation and prevention system may also be implemented on a Phone-as-a-Key system (PaaK) using BLE or Wi-Fi ToF.

As noted above, if the full 80 MHz bandwidth of BLE is used, a BLE ToF distance accuracy of about 2-6 meters may be achieved by performing ToF calculations 80 times on 1 MHz channels (or 40 times on 2 MHz channels). However, this leaves no BLE bandwidth for other communications when a ToF action is in progress.

A relay attack mitigation and prevention system may facilitate that for a more robust method of phase detection, the accuracy of 2-6 meters is not needed. The relay attack mitigation and prevention system may facilitate a sufficient level of accuracy to determine if a phase roll-over may have occurred (phase roll-over occurs at about 150 meters from the transmission source). For example, on receipt of the BLE message the system would determine the phase and then do a ToF measurement with accuracy that may be sufficiently determined if the distance reported from the phase detection is logical.

Table 1 below depicts the bandwidth consumption required for different ToF distance capabilities.

| BLE Channel Width Used | BLE Bandwidth Used | Resulting Distance Accuracy |
| --- | --- | --- |
| 4 MHz | 80 MHz | 37.5 m |
| 2 MHz | 80 MHz | 75.0 m |
| 1 MHz | 80 MHz | 150 m |
| 0.5 MHz | 80 MHz | 300 m |

As explained above, RF fingerprinting may be done by extracting relevant features of the key fob or phone signal and building a profile. For example, the associated spectra, phase, power, etc. for a given time of flight value may be fed into a neural net for classification. This profile may be also be decentralized over a blockchain to keep track of known attack vector fingerprints. Additionally, the GPS coordinates and date/time of the attempt could be stored in a database for access by other OEMs or Law Enforcement to help identify high-risk areas of times.

Figure 3:
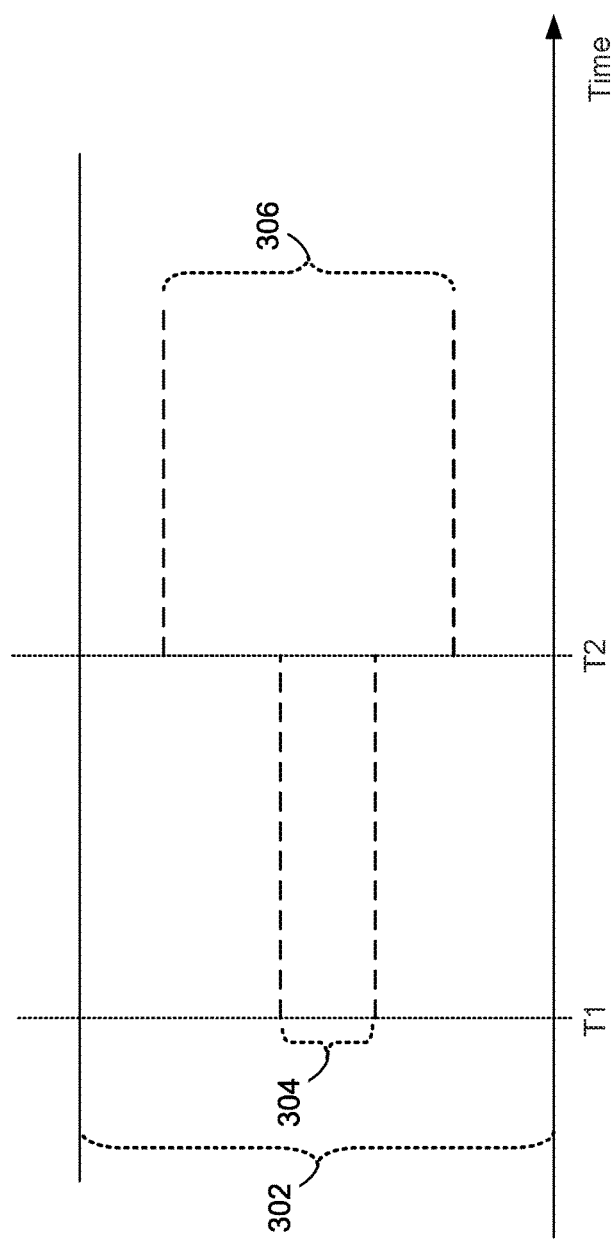
FIG. 3 depicts an illustrative schematic diagram for relay attack mitigation and prevention, in accordance with one or more example embodiments of the present disclosure.

FIG. 3 depicts an illustrative schematic diagram for relay attack mitigation and prevention, in accordance with one or more example embodiments of the present disclosure.

Referring to FIG. 3, there is shown the use of a relay attack mitigation and prevention system where enhanced ToF calculation may be performed using phase measurements using a subset (e.g., subset 304) of an 80 MHz BLE bandwidth (e.g., bandwidth 302).

A relay attack mitigation and prevention system may facilitate that during the BLE multi-phase detection, there is no need to use the full 80 MHz BLE bandwidth 302. Instead, a relay attack mitigation and prevention system may adjust the phase measurement bandwidth utilization to correspond to the approximate RTT or distance indicated by the received RF signal. In this method, only a subset of the BLE bandwidth (e.g., subset 304) is used for phase measurement. In doing so, BLE bandwidth may be used for other BLE communications, reducing the ToF calculation time because a subset of the 80 MHz BLE bandwidth is used, which saves bandwidth.

In that case, ToF calculation using phase measurements of subset 304 of the 80 MHz BLE bandwidth 302 results in a determination of whether a relay attack is occurring or not. Subsequently, remedial actions may be taken such as preventing access to the vehicle for such a relay attack. For example, instead of using a 1 MHz channel bandwidth, 4 MHz channel bandwidth may be used for phase measurements on subset 304 of the 80 MHz BLE bandwidth. For example, at a first instance, T1, and as a result of phase measurements using the subset 304 of the 80 MHz BLE bandwidth 302, an initial location of the key fob may be determined which is compared to a threshold distance from the vehicle. If it is determined that the key fob is outside the threshold distance from the vehicle, then access to the vehicle may be denied. However, if the key fob was determined to be inside the threshold distance, additional phase measurements may be performed on a larger subset of the 80 MHz BLE bandwidth to increase the accuracy of the location of the key fob. For example, after using subset 304 at time T1 there was determined that the key fob is within a threshold distance from the vehicle, then at time T2, a new subset 306 of the 80 MHz BLE bandwidth, may be used to determine a more accurate distance to the vehicle. The new subset 306 is larger than the subset 304.

Figure 4:
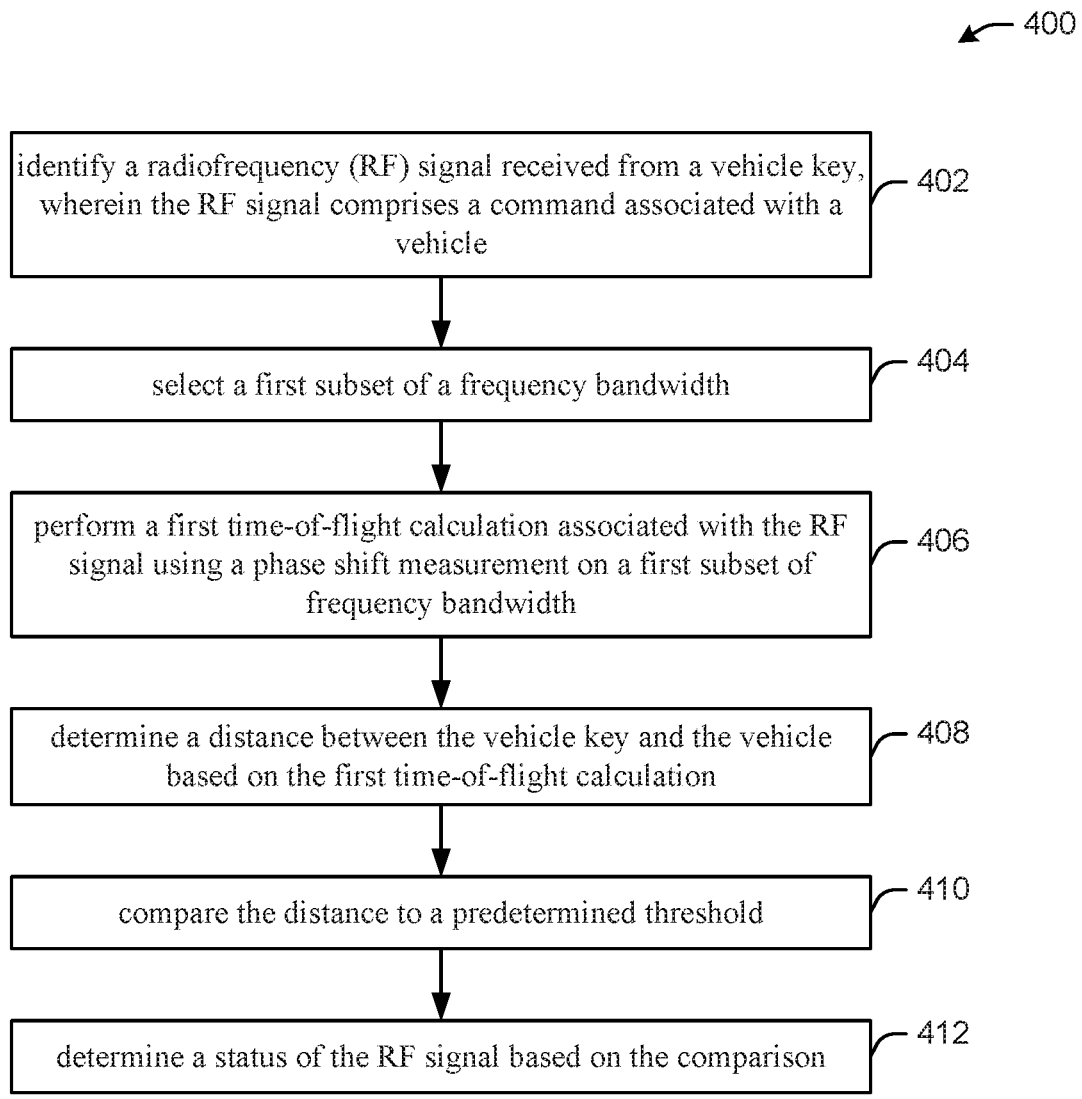
FIG. 4 depicts a flow diagram of an illustrative process for a relay attack mitigation and prevention system, in accordance with one or more embodiments of the disclosure.

FIG. 4 illustrates a flow diagram of illustrative process 400 for an illustrative relay attack mitigation and prevention system, in accordance with one or more example embodiments of the present disclosure.

At block 402, a device (e.g., the key fob or phone 103 and/or the vehicle 102 of FIG. 1) may identify a radio frequency (RF) signal received from a vehicle key, wherein the RF signal comprises a command associated with a vehicle. For example, the command may be associated with a passive entry or passive start of the vehicle At block 404, the device may select a first subset of a frequency bandwidth. In some embodiments, the frequency bandwidth is associated with Bluetooth® low energy (BLE) or Wi-Fi. The frequency bandwidth may be an 80 MHz bandwidth and wherein the first subset is less than 80 MHz bandwidth.

At block 406, the device may perform a first time-of-flight calculation associated with the RF signal using a phase shift measurement on a first subset of frequency bandwidth. In some embodiments, the device may perform a second time-of-flight calculation using a phase shift measurement of a second subset of frequency bandwidth, wherein the second subset of frequency bandwidth is greater than the first subset of frequency bandwidth. The phase shift measurement measures difference in the phase of a signal transmitted using the first subset of frequency bandwidth At block 408, the device may determine a distance between the vehicle key and the vehicle based on the first time-of-flight calculation.

At block 410, the device may compare the distance to a predetermined threshold associated with the vehicle. The predetermined threshold may be threshold distance between the fob and vehicle to indicate that the fob is with the range of the vehicle.

Deny access to the vehicle based on the distance being greater than the predetermined threshold.

At block 412, the device may determine a status of the RF signal based on the comparison. In some embodiments, the device may further determine an RF fingerprint associated with the RF signal, validate the RF fingerprint using a blockchain system, and may deny or grant access to the vehicle based on a result of the validation of the RF fingerprint. The RF fingerprint may be associated with unique characteristics of the RF signal. The device may also determine that the RF signal is associated with a blacklisted RF fingerprint.

It is understood that the above descriptions are for purposes of illustration and are not meant to be limiting.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   identifying, by a processor, a radio frequency (RF) signal received from a vehicle key, wherein the RF signal comprises a command associated with a vehicle;
   selecting a first subset of a frequency bandwidth;
   performing a first time-of-flight calculation associated with the RF signal using a phase shift measurement on a first subset of frequency bandwidth;
   performing a second time-of-flight calculation using a phase shift measurement of a second subset of frequency bandwidth, wherein the second subset of frequency bandwidth is greater than the first subset of frequency bandwidth;
   determining a distance between the vehicle key and the vehicle based on the first time-of-flight calculation;
   comparing the distance to a predetermined threshold associated with the vehicle; and determining a status of the RF signal based on the comparison.

2. The method of claim 1, wherein the frequency bandwidth is associated with Bluetooth low energy (BLE) or Wi-Fi.

3. The method of claim 1, wherein the frequency bandwidth is an 80 MHz bandwidth and wherein the first subset is less than 80 MHz bandwidth.

4. The method of claim 1, wherein the command is associated with a passive entry or passive start of the vehicle.

5. The method of claim 1, wherein the phase shift measurement measures difference in the phase of a signal transmitted using the first subset of frequency bandwidth.

6. The method of claim 1, further comprising denying access to the vehicle based on the distance being greater than the predetermined threshold.

7. The method of claim 1, further comprising:
determining an RF fingerprint associated with the RF signal;
validating the RF fingerprint using a blockchain system; and
denying or granting access to the vehicle based on a result of the validation of the RF fingerprint.

8. The method of claim 7, wherein the RF fingerprint is associated with unique characteristics of the RF signal.

9. The method of claim 1, further comprising determining that the RF signal is associated with a blacklisted RF fingerprint.

10. A system comprising:
a processor; and
a memory for storing executable instructions, the processor configured to execute the instructions to:
identify a radiofrequency (RF) signal received from a vehicle key, wherein the RF signal comprises a command associated with a vehicle;
select a first subset of a frequency bandwidth;
perform a first time-of-flight calculation associated with the RF signal using a phase shift measurement on a first subset of frequency bandwidth;
determine a distance between the vehicle key and the vehicle based on the first time-of-flight calculation;
compare the distance to a predetermined threshold;
determine a status of the RF signal based on the comparison;
determining an RF fingerprint associated with the RF signal;
validating the RF fingerprint using a blockchain system; and
denying or granting access to the vehicle based on a result of the validation of the RF fingerprint.

11. The system of claim 10, wherein the frequency bandwidth is associated with Bluetooth low energy (BLE) or Wi-Fi.

12. The system of claim 10, wherein the frequency bandwidth is an 80 MHz bandwidth and wherein the first subset is less than 80 MHz bandwidth.

13. The system of claim 10, further comprising the instructions to perform a second time-of-flight calculation using a phase shift measurement of a second subset of frequency bandwidth, wherein the second subset of frequency bandwidth is greater than the first subset of frequency bandwidth.

14. The system of claim 10, wherein the command is associated with a passive entry or passive start of the vehicle.

15. The system of claim 10, wherein the phase shift measurement measures difference in the phase of a signal transmitted using the first subset of frequency bandwidth.

16. The system of claim 10, further comprising the instructions to deny access to the vehicle based on the distance being greater than the predetermined threshold.

17. The system of claim 10, wherein the RF fingerprint is associated with unique characteristics of the RF signal.

18. A non-transitory computer-readable medium storing computer-executable instructions which when executed by one or more processors result in performing operations comprising:
identifying a radiofrequency (RF) signal received from a vehicle key, wherein the RF signal comprises a command associated with a vehicle;
selecting a first subset of a frequency bandwidth;
performing a first time-of-flight calculation associated with the RF signal using a phase shift measurement on a first subset of frequency bandwidth;
determining a distance between the vehicle key and the vehicle based on the first time-of-flight calculation;
comparing the distance to a predetermined threshold; and
determining a status of the RF signal based on the comparison.

19. A method comprising:
identifying, by a processor, a radio frequency (RF) signal received from a vehicle key, wherein the RF signal comprises a command associated with a vehicle;
selecting a first subset of a frequency bandwidth, wherein the frequency bandwidth is an 80 MHz bandwidth and wherein the first subset is less than 80 MHz bandwidth;
performing a first time-of-flight calculation associated with the RF signal using a phase shift measurement on a first subset of frequency bandwidth;
determining a distance between the vehicle key and the vehicle based on the first time-of-flight calculation;
comparing the distance to a predetermined threshold associated with the vehicle; and
determining a status of the RF signal based on the comparison.

* * * * *